United States Patent
Seki et al.

(10) Patent No.: US 9,931,931 B2
(45) Date of Patent: Apr. 3, 2018

(54) DRIVING FORCE DISTRIBUTION APPARATUS AND METHOD FOR DISTRIBUTING DRIVING FORCE

(71) Applicant: HONDA MOTOR CO., LTD., Tokyo (JP)

(72) Inventors: Takayuki Seki, Wako (JP); Norihisa Nihanda, Wako (JP); Shoichi Ohyagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 601 days.

(21) Appl. No.: 14/499,242

(22) Filed: Sep. 29, 2014

(65) Prior Publication Data

US 2015/0112563 A1 Apr. 23, 2015

(30) Foreign Application Priority Data

Oct. 17, 2013 (JP) .................................. 2013-216397

(51) Int. Cl.
*B60K 23/08* (2006.01)
*B60K 17/35* (2006.01)

(52) U.S. Cl.
CPC .......... *B60K 23/0808* (2013.01); *B60K 17/35* (2013.01); *B60K 2023/0833* (2013.01); *B60K 2023/0858* (2013.01)

(58) Field of Classification Search
None
See application file for complete search history.

(56) References Cited

U.S. PATENT DOCUMENTS 5,742,917 A * 4/1998 Matsuno ............ B60K 17/3462
180/197

FOREIGN PATENT DOCUMENTS

| JP | 02-279427 | 11/1990 |
| JP | 04-103433 | 4/1992 |
| JP | 2011-130629 | 6/2011 |

OTHER PUBLICATIONS

Japanese Office Action for corresponding JP Application No. 2013-216397, dated Aug. 23, 2016.

* cited by examiner

Primary Examiner — Colby M Hansen
(74) *Attorney, Agent, or Firm* — Mori & Ward, LLP

(57) ABSTRACT

A driving force distribution apparatus includes a basic distribution ratio calculator, a servo controller, and an adjuster. The basic distribution ratio calculator is configured to calculate a basic distribution ratio between a front driving force for front wheels and a rear driving force for rear wheels based on loads exerted on the front and rear wheels of a vehicle. The servo controller is configured to correct the basic distribution ratio so as to increase or decrease the basic distribution ratio based on a deviation between a target value of a rotation difference between the front and rear wheels and a measured value of the rotation difference between the front and rear wheels. The adjuster is configured to perform adjustment so that the rear driving force calculated based on the basic distribution ratio corrected by the servo controller does not exceed a total driving force.

7 Claims, 3 Drawing Sheets

DRIVING FORCE DISTRIBUTION APPARATUS AND METHOD FOR DISTRIBUTING DRIVING FORCE

CROSS-REFERENCE TO RELATED APPLICATIONS

The present application claims priority under 35 U.S.C. § 119 to Japanese Patent Application No. 2013-216397, filed Oct. 17, 2013, entitled "Driving Force Distribution Control Apparatus for Vehicle." The contents of this application are incorporated herein by reference in their entirety.

BACKGROUND

1. Field

The present disclosure relates to a driving force distribution apparatus and a method for distributing a driving force.

2. Description of the Related Art

Japanese Unexamined Patent Application Publication Nos. 4-103433 and 2-279427 disclose a torque-split four-wheel-drive vehicle in which a driving force from an engine is directly transmitted to one set of the front and rear wheels (primary drive wheels) and a distribution-controlled driving force is transmitted to the other set thereof (secondary drive wheels) through a torque distribution clutch. The distribution control techniques disclosed in these patent documents basically controls a rotation speed difference between the front and rear wheels such that it approaches zero. In particular, the disclosed techniques are the ones of controlling driving force distribution using a rotation speed difference between the front and rear wheels corrected in accordance with a vehicle speed and a detected tire diameter difference between the front and rear wheels.

SUMMARY

According to one aspect of the present invention, a driving force distribution apparatus for distributing a driving force from a driving source to front and rear wheels of a vehicle includes a basic distribution ratio calculating device, a servo control device, and an adjusting device. The basic distribution ratio calculating device is configured to calculate a basic distribution ratio between the driving force to the front wheels and the driving force to the rear wheels on the basis of loads exerted on the front and rear wheels of the vehicle. The servo control device is configured to correct the basic distribution ratio so as to increase or decrease the basic distribution ratio on the basis of a deviation between a target value of a rotation difference between the front and rear wheels and a measured value of the rotation difference between the front and rear wheels. The target value and the measured value correspond to a running state of the vehicle. The adjusting device is configured to perform adjustment such that the driving force distributed to the rear wheels indicated by the distribution ratio corrected by the servo control device does not exceed a total driving force.

According to another aspect of the present invention, a driving force distribution apparatus includes a basic distribution ratio calculator, a servo controller, and an adjuster. The basic distribution ratio calculator is configured to calculate a basic distribution ratio between a front driving force for front wheels and a rear driving force for rear wheels based on loads exerted on the front and rear wheels of a vehicle. The servo controller is configured to correct the basic distribution ratio so as to increase or decrease the basic distribution ratio based on a deviation between a target value of a rotation difference between the front and rear wheels and a measured value of the rotation difference between the front and rear wheels. The adjuster is configured to perform adjustment so that the rear driving force calculated based on the basic distribution ratio corrected by the servo controller does not exceed a total driving force.

According to further aspect of the present invention, in a method for distributing a driving force, A basic distribution ratio between a front driving force for front wheels and a rear driving force for rear wheels is calculated based on loads exerted on the front and rear wheels of a vehicle. The basic distribution ratio is corrected so as to increase or decrease the basic distribution ratio based on a deviation between a target value of a rotation difference between the front and rear wheels and a measured value of the rotation difference between the front and rear wheels. Adjustment is performed so that the rear driving force calculated based on the basic distribution ratio corrected by the correcting of the basic distribution ratio does not exceed a total driving force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
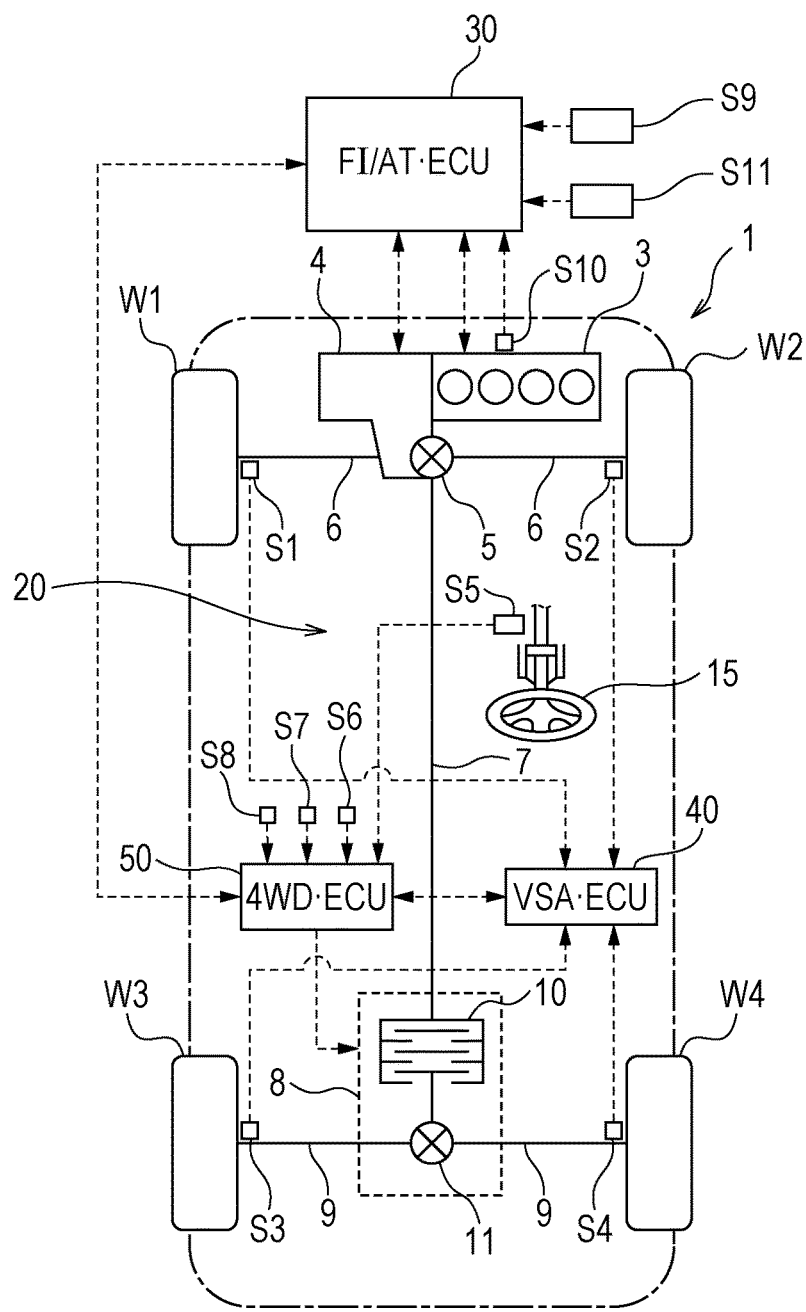
FIG. 1 illustrates a schematic configuration of a four-wheel-drive vehicle that includes a driving force distribution control apparatus according to an embodiment.

The embodiments will now be described with reference to the accompanying drawings, wherein like reference numerals designate corresponding or identical elements throughout the various drawings.

A four-wheel-drive vehicle 1 illustrated in FIG. 1 includes a transversely mounted engine (driving source) 3 in the front section of the vehicle, an automatic transmission 4 installed integrally with the engine 3, and a driving force transfer path 20 for use in transferring a driving force from the engine 3 to front wheels W1 and W2 and rear wheels W3 and W4.

The engine 3 includes an output shaft (not illustrated) coupled to the left and right front wheels W1 and W2, which are primary drive wheels, through the automatic transmission 4, a front differential (hereinafter referred to as "front diff") 5, and left and right front drive shafts 6. The output shaft of the engine 3 is further coupled to the left and right rear wheels W3 and W4, which are secondary drive wheels, through the automatic transmission 4, the front diff 5, a propeller shaft 7, a rear differential unit (hereinafter referred to as "rear diff unit") 8, and left and right rear drive shafts 9.

The rear diff unit 8 includes a rear differential (hereinafter referred to as "rear diff") 11 for distributing a driving force to the left and right rear drive shafts 9 and a longitudinal torque distribution clutch 10 for connection and disconnection of the driving force transfer path from the propeller shaft 7 to the rear diff 11. The longitudinal torque distribution clutch 10 is a driving force distribution apparatus for controlling a driving force distributed to the rear wheels W3 and W4 in the driving force transfer path 20 and may be an electromagnetic clutch. A 4WD•ECU 50, which is described below, is configured to perform control for driving the front wheels W1 and W2 as the primary drive wheels and driving the rear wheels W3 and W4 as the secondary drive wheels by controlling the driving force distributed to the rear wheels W3 and W4 using the longitudinal torque distribution clutch 10.

That is, when the longitudinal torque distribution clutch 10 is disengaged (disconnected), the rotation of the propeller shaft 7 is not transmitted toward the rear diff 11, the torque of the engine 3 is fully transmitted to the front wheels W1 and W2, and thus the vehicle is in a front-wheel-drive (two-wheel-drive) state. In contrast, when the longitudinal torque distribution clutch 10 is connected, the rotation of the propeller shaft 7 is transmitted toward the rear diff 11, the torque of the engine 3 is distributed to both the front wheels W1 and W2 and the rear wheels W3 and W4, and thus the vehicle is in a four-wheel-drive state. In this case, the engagement force (engagement amount of) the longitudinal torque distribution clutch 10 can be variably controlled, a driving force corresponding to the engagement force (engagement amount) is distributed to the rear wheels (secondary drive wheels) W3 and W4.

The four-wheel-drive vehicle 1 includes an FI/AT•ECU 30, a vehicle stability assist (VSA)•ECU 40, and the 4WD•ECU 50, all of which are a control device for controlling the driving of a vehicle. The four-wheel-drive vehicle 1 further includes a left front speed sensor S1 configured to detect a wheel speed of the left front wheel W1 on the basis of a rotational speed of the left front drive shaft 6, a right front wheel speed sensor S2 configured to detect a wheel speed of the right front wheel W2 on the basis of a rotational speed of the right front drive shaft 6, a left rear wheel speed sensor S3 configured to detect a wheel speed of the left rear wheel W3 on the basis of a rotational speed of the left rear drive shaft 9, and a right rear wheel speed sensor S4 configured to detect a wheel speed of the right rear wheel W4 on the basis of a rotational speed of the right rear drive shaft 9. These four wheel speed sensors S1 to S4 are configured to detect wheel speeds VW1 to VW4 of the left and right front and rear wheels W1 to W4, respectively. Detected signals for the wheel speeds VW1 to VW4 are sent to the VSA•ECU 40.

The four-wheel-drive vehicle 1 further includes a steering angle sensor S5 configured to detect a steering angle of a steering wheel 15, a yaw rate sensor S6 configured to detect a yaw rate of a vehicle body, a lateral acceleration sensor S7 configured to detect a lateral acceleration of the vehicle body, and a vehicle speed sensor S8 configured to detect a vehicle body speed (vehicle speed) of the vehicle. Signals detected by the steering angle sensor S5, yaw rate sensor S6, lateral acceleration sensor S7, and vehicle speed sensor S8 are sent to the 4WD•ECU 50.

The FI/AT•ECU 30 is a control device configured to control the engine 3 and the automatic transmission 4 and includes a microcomputer including a random-access memory (RAM), a read-only memory (ROM), a central processing unit (CPU), and an input/output (I/O) interface (all of which are not illustrated). The FI/AT•ECU 30 is configured to receive a signal for a throttle opening degree Th detected by a throttle opening degree sensor S9, a signal for an engine rotational speed Ne detected by an engine rotational speed sensor S10, and a signal for a shift position detected by a shift position sensor S11. The FI/AT•ECU 30 stores an engine torque map in which the relationship between an engine torque estimated value Te and each of the engine rotational speed Ne and throttle opening degree Th is written and is configured to calculate the engine torque estimated value Te on the basis of the throttle opening degree Th detected by the throttle opening degree sensor S9 and the engine rotational speed Ne detected by the engine rotational speed sensor S10.

The VSA•ECU 40 is a control device having the function as an antilock braking system (ABS) for preventing the wheels from locking up while braking by antilock controlling for the left and right front and rear wheels W1 to W4, the function as a traction control system (TCS) for preventing the wheels from idling while the vehicle is accelerating or the like, and the function as a lateral slip suppression system while cornering and is configured to perform vehicle behavior stability control by controlling the above three functions. The VSA•ECU 40 includes a microcomputer, as in the above-described FI/AT•ECU 30.

The 4WD•ECU 50 includes a microcomputer, as in the FI/AT•ECU 30 and the VSA•ECU 40. The 4WD•ECU 50, FI/AT•ECU 30, and VSA•ECU 40 are connected to one another. Accordingly, the 4WD•ECU 50 is configured to receive signals detected by the above-described wheel speed sensors S1 to S4 and shift position sensor S11 and information on the engine torque estimated value Te by serial communications with the FI/AT•ECU 30 and VSA•ECU 40. In accordance with these input information items, the 4WD•ECU 50 computes a driving force to be distributed to the rear wheels W3 and W4 and its corresponding driving current value to the longitudinal torque distribution clutch 10 on the basis of a control program stored in the ROM, flag values and computed values stored in the RAM, and the like and outputs a driving signal based on that computation to the longitudinal torque distribution clutch 10, as described below. This controls the engagement force of the longitudinal torque distribution clutch 10 and controls the driving force distributed to the rear wheels W3 and W4.

Figure 2:
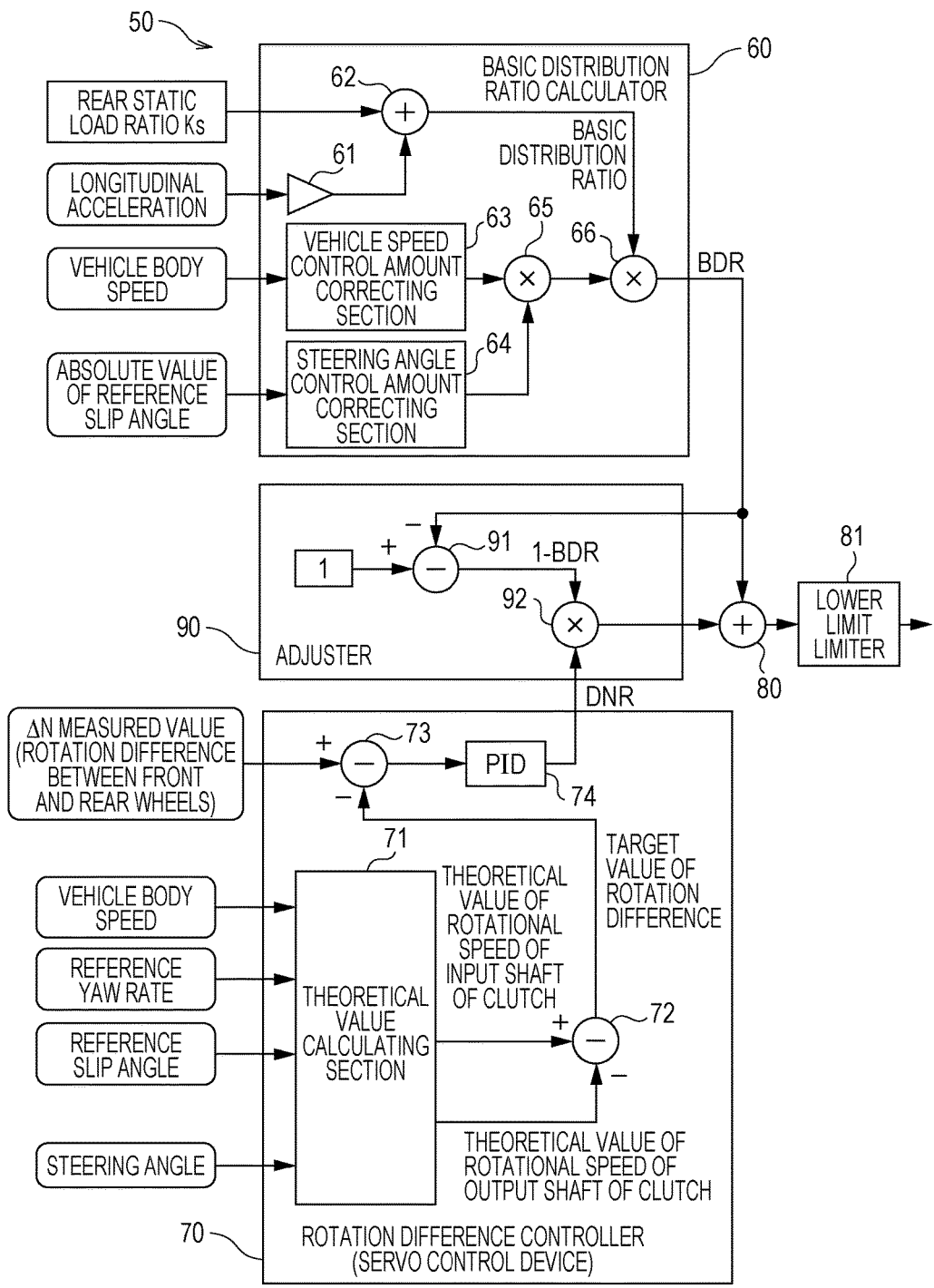
FIG. 2 is a block diagram that schematically illustrates control functions performed by a 4WD•ECU in FIG. 1.

FIG. 2 is a block diagram that schematically illustrates control functions performed by the 4WD•ECU 50. The illustrated control functions are achieved by a computer program designed to achieve the functions. A basic distribution ratio calculator 60 is configured to determine a basic distribution ratio (a decimal between 0 and 1) of a driving force to the rear wheels (secondary drive wheels) W3 and W4 in accordance with a static load ratio (rear static load ratio Ks) of a static load of the rear wheels (secondary drive wheels) W3 and W4 to that of the front wheels (primary drive wheels) W1 and W2. For example, a basic distribution ratio can be calculated by addition of a correction value to the rear static load ratio Ks by an adder 62, the correction value being calculated by a multiplier 61 multiplying an acceleration in the longitudinal direction of a vehicle body (longitudinal acceleration) by a coefficient.

The basic distribution ratio based on the rear static load ratio Ks output from the adder 62 may be appropriately corrected using an appropriate factor in accordance with the running state of the vehicle. One example of the components for such a correction may be a vehicle speed control amount correcting section 63 and a steering angle control amount correcting section 64. The basic distribution ratio based on the rear static load ratio Ks tends to cause an oversteer condition. To suppress such an oversteer tendency, the vehicle includes the vehicle speed control amount correcting section 63 and the steering angle control amount correcting section 64. The vehicle speed control amount correcting section 63 is configured to produce a correction coefficient corresponding to a vehicle speed and may retain a table that stores correction coefficients corresponding to vehicle speeds, for example. The steering angle control amount correcting section 64 is configured to produce a correction coefficient corresponding to an absolute value of a reference slip angle and may retain a table that stores correction coefficients corresponding to absolute values of reference slip angles, for example.

The correction coefficients produced by both the correcting sections 63 and 64 are multiplied together in a multiplier 65 to obtain a correction coefficient being the product. The obtained correction coefficient is multiplied by an output from the adder 62 (basic distribution ratio based on the rear static load ratio Ks) in a multiplier 66. In this way, the basic distribution ratio is corrected to suppress the oversteer tendency in accordance with the vehicle speed and the reference slip angle.

A rotation difference controller 70 is configured to calculate a reference value (target value) of a rotation difference (abbreviated as ΔN) between the front wheels (primary drive wheels) W1 and W2 and the rear wheels (secondary drive wheels) W3 and W4 and perform servo control such that an actual measured value of ΔN approaches the reference value (target value). The rotation difference controller 70 includes a theoretical value calculating section 71. The theoretical value calculating section 71 calculates theoretical values of rotational speeds of the front and rear wheels (theoretical value of a rotational speed of an input shaft of the clutch and theoretical value of a rotational speed of an output shaft of the clutch) on the basis of the steering angle, vehicle speed, yaw rate, and slip angle of the vehicle in accordance with a reference model of the rotation difference between the front and rear wheels. A subtracter 72 is configured to calculate a target value of a rotation difference that is the difference between the theoretical values of the rotational speeds of the front and rear wheels calculated by the theoretical value calculating section 71 (theoretical value of the rotational speed of the input shaft of the clutch and theoretical value of the rotational speed of the output shaft of the clutch).

Figure 3:
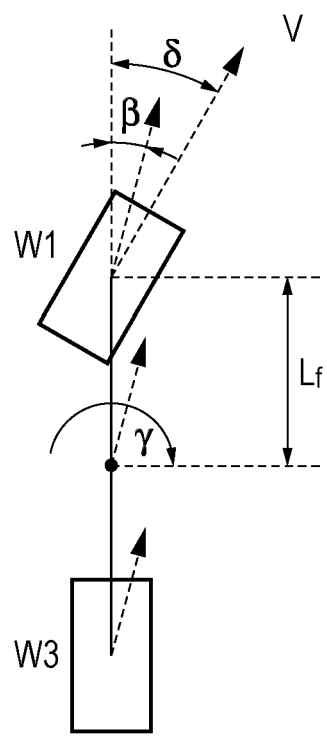
FIG. 3 illustrates a two-wheel vehicle model.

As one example, the theoretical value calculating section 71 may calculate a theoretical value of a rotational speed of the rotational shaft (input shaft) of the clutch 10 near the front wheels (primary drive wheels) W1 and W2 and a theoretical value of a rotational speed of the rotational shaft (output shaft) of the clutch 10 near the rear wheels (secondary drive wheels) W3 and W4 on the basis of the following expressions:

Theoretical Value of Rotational Speed of Input Shaft of Clutch=$A\{V\cdot\cos(\delta-\beta)+\gamma\cdot L_f \sin \delta\}$ Theoretical Value of Rotational Speed of Output Shaft of Clutch=$B\cdot V\cdot\cos \beta$ The target value of the rotation difference (ΔN) calculated by the subtracter 72 can be given as:

Target Value of Rotation Difference (ΔN)=Theoretical Value of Rotational Speed of Input Shaft of Clutch−Theoretical Value of Rotational Speed of Output Shaft of Clutch The above expressions are set on the basis of a publicly known ideal two-wheel vehicle model illustrated in FIG. 3. δ indicates the steering angle, β indicates the reference slip angle, γ indicates the reference yaw rate, $L_f$ indicates the distance from the center of gravity of the vehicle to the front drive shaft 6, V indicates the vehicle body speed, A indicates the coefficient for converting the vehicle speed into the rotational speed of the front-wheel-side rotational shaft of the clutch 10, and B indicates the coefficient for converting the vehicle speed into the rear-wheel-side rotational speed of the rotational shaft of the clutch 10. The front-wheel-side conversion coefficient A is determined on the basis of a tire dynamic load radius, a front-drive gear ratio, a hypoid gear ratio, and the like of each of the front wheels (primary drive wheels) W1 and W2. The rear-wheel-side conversion coefficient B is determined on the basis of a tire dynamic load radius, a rear-wheel gear ratio, and the like of each of the rear wheels (secondary drive wheels) W3 and W4. The reference yaw rate γ is calculated from the present vehicle speed V and steering angle δ of the four-wheel-drive vehicle 1 on the basis of the ideal two-wheel vehicle model. The reference steering angle β is calculated from a present vehicle speed V, longitudinal G, and lateral G of the four-wheel-drive vehicle 1 on the basis of the ideal two-wheel vehicle model.

A subtracter 73 is configured to calculate a deviation between an actual measured value of the rotation difference ΔN (hereinafter referred to as ΔN measured value) between the input and output shafts of the clutch 10 and the target value of the rotation difference (ΔN) calculated by the subtracter 72. The output of the subtracter 73 is input as a servo control deviation value "ΔN measured value−ΔN target value" into a proportion, integration, and differentiation (PID) controller 74. The output of the PIC controller 74 is output as a servo control output signal of the rotation difference controller 70 (control amount for rotation difference for correcting the basic distribution ratio). As one example, the servo control output signal output from the rotation difference controller 70 (control amount for rotation difference) may be represented as a decimal in the range between −1 and +1 (that is, a decimal value below the absolute value 1).

The servo control output signal DNR output from the rotation difference controller 70 (control amount for rotation difference) is used in an adder 80 as a parameter for correcting the basic distribution ratio BDR calculated by the basic distribution ratio calculator 60 (output of the multiplier 66). Specifically, the servo control output signal output from the rotation difference controller 70 (control amount for rotation difference) is corrected by an adjuster 90. The corrected servo control output signal (control amount for rotation difference) is input into the adder 80. The input servo control output signal (control amount for rotation difference) is added to the basic distribution ratio calculated by the basic distribution ratio calculator 60 (output of the multiplier 66). The rotation difference controller 70 and the adder 80 function as the servo control device configured to correct the basic distribution ratio so as to increase or decrease it on the basis of the deviation between the target value of the rotation difference between the front and rear wheels and the measured value of the rotation difference between the front and rear wheels, the target value and the measured value corresponding to the running state of the vehicle.

The adjuster 90, which is disposed between the rotation difference controller 70 and the adder 80, is configured to adjust a driving force distributed to the rear wheels indicated by a distribution ratio corrected by the servo control device (output of the adder 80) such that the driving force does not exceed the total driving force. Specifically, the adjuster 90 is configured to perform adjustment such that a gain in the servo control device (deviation parameter gain) decreases with increase in the basic distribution ratio by adjusting the value of an output of the rotation difference controller 70 that is a deviation parameter input into the adder 80 as described below.

In the adjuster 90, a subtracter 91 subtracts the basic distribution ratio BDR (a decimal value below "1") calculated by the basic distribution ratio calculator 60 (output of the multiplier 66) from a predetermined value corresponding to the total driving force ("1" in this example). A multiplier 92 multiplies the output DNR of the rotation difference controller 70 (that is, control amount for rotation difference) by "1−BDR," which is the output of the subtracter 91. That is, the subtracter 91 functions as a device configured to calculate, as the gain coefficient, the difference "1−BDR" between the predetermined value "1" and the basic distribution ratio calculated by the basic distribution ratio calculator 60. The multiplier 92 functions as a multiplying device configured to calculate a corrected rotation difference control value "(1−BDR)DNR" by multiplying the rotation difference control amount DNR calculated by the rotation difference controller 70 by the corrected gain "1−BDR" and thus configured to adjust a gain of a signal (that is, rotation difference control amount DNR) based on the deviation between the target value of the rotation difference between the front and rear wheels and the measured value of the rotation difference between the front and rear wheels in the servo control device in accordance with the gain coefficient "1−BDR."

Accordingly, "corrected distribution ratio" obtained by the addition of the corrected rotation difference control amount "(1−BDR)DNR" to the basic distribution ratio BDR (output of the multiplier 66) by the adder 80 can be represented as Corrected Distribution Ratio=(1−BDR)DNR+BDR. Here, because the rotation difference control amount DNR is a decimal value below the absolute value 1, "corrected distribution ratio" is a value below 1, thus it can be adjusted so as not to exceed the distribution ratio "1," which corresponds to the total driving force.

One example case where the basic distribution ratio BDR is "0.7" and the rotation difference control amount DNR is "0.4" is described below. If the adjuster 90 is not included, the output of the adder 80 is "1.1," which exceeds the distribution ratio "1," which corresponds to the total driving force, and thus a tight corner braking phenomenon would occur. In contrast, when the adjuster 90 is included, as in the embodiment, the corrected distribution ratio (1−BDR)DNR+BDR is "0.82," which has been adjusted so as not to exceed the distribution ratio "1," which corresponds to the total driving force, and thus a tight corner braking phenomenon can be avoided.

Negative values, which are smaller than "0," in the output of the adder 80 are set to "0" by a lower limit limiter 81. That is, the minimal value of the driving force distribution ratio to the rear wheels is set to "0." This may happen when an actual ΔN measured value is smaller than a ΔN target value, which is an ideal value. The output of the lower limit limiter 81 is an indicated value of the driving force distribution ratio to the rear wheels.

In this way, the engagement force of the longitudinal torque distribution clutch (driving force distributing apparatus) 10 is basically determined from the basic distribution ratio BDR, and the engagement force of the longitudinal torque distribution clutch (driving force distributing apparatus) 10 is variably controlled in accordance with the rotation difference control amount DNR of the rotation difference controller 70 corrected by the adjuster 90. In this manner, the servo control is performed so as to correct the driving force to the rear wheels (secondary drive wheels) W3 and W4 distributed by the longitudinal torque distribution clutch (driving force distributing apparatus) 10. For example, when the driving force to the rear wheels (secondary drive wheels) W3 and W4 is insufficient, the deviation value "ΔN measured value−ΔN target value" output from the subtracter 73 is positive, and the servo control is performed so as to increase the driving force to the rear wheels (secondary drive wheels) W3 and W4. By contrast, when the driving force to the rear wheels (secondary drive wheels) W3 and W4 is excessive, the deviation value "ΔN measured value−ΔN target value" output from the subtracter 73 is negative, and the servo control is performed so as to reduce the driving force to the rear wheels (secondary drive wheels) W3 and W4. Additionally, in both cases, the distribution ratio is adjusted such that an indicated value of the driving force to the rear wheels (secondary drive wheels) W3 and W4 does not exceed the total driving force. By such control, the occurrence of tight corner braking phenomena can be prevented.

The rear wheels may be the primary drive wheels, and the front wheels may be the secondary drive wheels. The longitudinal torque distribution clutch (driving force distributing apparatus) 10 is not limited to an electromagnetic clutch and may be a fluid pressure clutch. The type of computations, including subtraction and multiplication, in the adjuster 90 may be changed to any type in design. The predetermined value corresponding to the total driving force is not limited to "1" and may be changed to any value in design. One variation of the adjuster 90 may be a configuration in which an upper limit limiter having the upper limit "1" is disposed on the output side of the adder 80. However, as in the embodiment, with the configuration that performs adjustment such that the gain in the servo control device decreases with increase in the basic distribution ratio, the upper limit control can be smoothly performed, and the control can be stabilized.

A driving force distribution apparatus for distributing a driving force from a driving source to front and rear wheels of a vehicle according to an aspect of an embodiment includes a basic distribution ratio calculating device (60) configured to calculate a basic distribution ratio between the driving force to the front wheels and the driving force to the rear wheels on the basis of loads exerted on the front and rear wheels of the vehicle, a servo control device (70, 80) configured to correct the basic distribution ratio so as to increase or decrease the basic distribution ratio on the basis of a deviation between a target value of a rotation difference between the front and rear wheels and a measured value of the rotation difference between the front and rear wheels, the target value and the measured value corresponding to a running state of the vehicle, and an adjusting device (90) configured to perform adjustment such that the driving force distributed to the rear wheels indicated by the distribution ratio corrected by the servo control device does not exceed a total driving force. The numbers in the parentheses are provided only for reference to indicate corresponding components in the embodiment described below.

In accordance with the aspect of the embodiment, the basic distribution ratio between the driving force to the front wheels and that to the rear wheels is calculated on the basis of the loads exerted on the front and rear wheels of the vehicle, and the servo control is performed such that the basic distribution ratio is corrected so as to increase and decrease on the basis of the deviation between the target value of the rotation difference between the front and rear wheels and the measured value of the rotation difference between the front and rear wheels, the target value and the measured value corresponding to the running state of the vehicle. With only such servo control, however, because the total driving force is not taken into consideration, control that allows a driving force exceeding the total driving force to be distributed to the rear wheels may be performed. In that case, a tight corner braking phenomenon may occur. In contrast, in the embodiment, the adjusting device configured to perform adjustment such that the driving force distributed to the rear wheels indicated by the distribution ratio corrected by the servo control device does not exceed the total driving force is included. Accordingly, the vehicle can be controlled so as to prevent the occurrence of tight corner braking phenomena.

As one example, the adjusting device (90) may be configured to perform adjustment such that a gain in the servo control device (70) decreases with increase in the basic distribution ratio. Specifically, the adjusting device (90) may include a device (91) configured to calculate a difference between one and the basic distribution ratio calculated by the basic distribution ratio calculating device (60) as a gain coefficient and a multiplying device (92) configured to adjust a gain of a signal based on the deviation between the target value of the rotation difference between the front and rear wheels and the measured value of the rotation difference between the front and rear wheels in the servo control device (70) in accordance with the gain coefficient. With the adjustment in which the gain in the servo control device (70) decreases with increase in the basic distribution ratio, the gain of the signal based on the deviation between the target value of the rotation difference between the front and rear wheels and the measured value of the rotation difference between the front and rear wheels, the gain acting to increase the basic distribution ratio in the servo control loop as the basic distribution ratio increases, is reduced. Thus correction of increasing the basic distribution ratio can be suppressed. Accordingly, the adjustment can be performed such that the driving force distributed to the rear wheels indicated by the corrected distribution ratio does not exceed the total driving force.

Obviously, numerous modifications and variations of the present invention are possible in light of the above teachings. It is therefore to be understood that within the scope of the appended claims, the invention may be practiced otherwise than as specifically described herein.

What is claimed is:

1. A driving force distribution apparatus for distributing a driving force from a driving source to front and rear wheels of a vehicle, the driving force distribution apparatus comprising:
a control device configured to:
calculate a distribution ratio between the driving force to the front wheels and the driving force to the rear wheels on the basis of a static load ratio of a static load of the rear wheels to a static load of the front wheels of the vehicle;
correct the distribution ratio so as to increase or decrease the distribution ratio on the basis of a deviation between a target value of a rotation difference between the front and rear wheels and a measured value of the rotation difference between the front and rear wheels, the target value being determined on the basis of a running state of the vehicle, the rotation difference between the front and rear wheels being a difference in a rotational speed of the front wheels and the rotational speed of the rear wheels, and
adjust the distribution ratio such that the driving force distributed to the rear wheels indicated by the distribution ratio corrected by the control device does not exceed a total driving force; and
a rear differential unit connected to the rear wheels, the rear differential unit configured to be controlled by the control device on the basis of the distribution ratio.

2. The driving force distribution apparatus according to claim 1, wherein the control device is configured to perform adjustment such that a gain of a signal decreases in response to an increase in the distribution ratio.

3. The driving force distribution apparatus according to claim 2, wherein the control device is configured to:
calculate a difference between one and the distribution ratio calculated by the control device as a gain coefficient, and
adjust the gain of the signal in accordance with the gain coefficient, the signal being based on the deviation between the target value of the rotation difference between the front and rear wheels and the measured value of the rotation difference between the front and rear wheels.

4. A driving force distribution apparatus comprising:
a control device configured to:
calculate a distribution ratio between a front driving force for front wheels and a rear driving force for rear wheels based on a static load ratio of a static load of the rear wheels to a static load of the front wheels of a vehicle;
correct the distribution ratio so as to increase or decrease the distribution ratio based on a deviation between a target value of a rotation difference between the front and rear wheels and a measured value of the rotation difference between the front and rear wheels, the rotation difference between the front and rear wheels being a difference in a rotational speed of the front wheels and the rotational speed of the rear wheels, and
adjust the distribution ratio so that the rear driving force calculated based on the distribution ratio corrected by the control device does not exceed a total driving force; and
a rear differential unit connected to the rear wheels, the rear differential unit configured to be controlled by the control device based on the adjusted distribution ratio.

5. The driving force distribution apparatus according to claim 4, wherein the control device is configured to perform adjustment such that a gain of a signal decreases in response to an increase in the distribution ratio.

6. The driving force distribution apparatus according to claim 5, wherein the control device is configured to
calculate a difference between one and the distribution ratio calculated by the distribution ratio calculator as a gain coefficient, and
adjust the gain of the signal in accordance with the gain coefficient, the signal being based on the deviation between the target value of the rotation difference between the front and rear wheels and the measured value of the rotation difference between the front and rear wheels.

7. A driving force distribution apparatus comprising:
control means for
calculating a distribution ratio between a front driving force for front wheels and a rear driving force for rear wheels based on a static load ratio of a static load of the rear wheels to a static load of the front wheels of a vehicle;
correcting the distribution ratio so as to increase or decrease the distribution ratio based on a deviation between a target value of a rotation difference between the front and rear wheels and a measured value of the rotation difference between the front and rear wheels, the rotation difference between the front and rear wheels being a difference in a rotational speed of the front wheels and the rotational speed of the rear wheels, and performing adjustment of the distribution ratio so that the rear driving force calculated based on the distribution ratio corrected by the control means does not exceed a total driving force; and a rear differential unit connected to the rear wheels, the rear differential unit configured to be controlled by the control means based on of the distribution ratio.

* * * * *